United States Patent
Paleja et al.

(10) Patent No.: US 8,055,749 B1
(45) Date of Patent: Nov. 8, 2011

(54) OPTIMIZING MEDIA DISTRIBUTION USING METRICS

(75) Inventors: Ameesh Paleja, Lynnwood, WA (US); Samuel S. Gigliotti, Seattle, WA (US); Alan A. Raddatz, Seattle, WA (US); Bradley M. Baron, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 164 days.

(21) Appl. No.: 12/242,571

(22) Filed: Sep. 30, 2008

(51) Int. Cl.
 *G06F 15/173* (2006.01)
(52) U.S. Cl. ......... 709/223; 709/224; 709/229; 709/232
(58) Field of Classification Search .................. 709/223, 709/224, 229, 232
See application file for complete search history.

(56) References Cited

U.S. PATENT DOCUMENTS

| | | | |
|---|---|---|---|
| 7,403,993 B2 * | 7/2008 | John et al. ...................... | 709/226 |
| 7,873,074 B1 * | 1/2011 | Boland .......................... | 370/468 |
| 2003/0126598 A1 * | 7/2003 | Agnihotri et al. .............. | 725/32 |
| 2003/0220110 A1 * | 11/2003 | Kizu et al. .................... | 455/445 |
| 2004/0019675 A1 * | 1/2004 | Hebeler et al. ................ | 709/224 |
| 2006/0098573 A1 * | 5/2006 | Beer et al. ..................... | 370/230 |
| 2006/0146703 A1 * | 7/2006 | Cha et al. ...................... | 370/229 |
| 2006/0156201 A1 * | 7/2006 | Zhang et al. .................. | 714/776 |
| 2006/0268695 A1 * | 11/2006 | Dhesikan et al. ............. | 370/229 |
| 2007/0083500 A1 * | 4/2007 | Zibitsker ......................... | 707/3 |
| 2007/0271358 A1 * | 11/2007 | Gaddy .......................... | 709/222 |
| 2008/0189418 A1 * | 8/2008 | Kimbrel et al. ............... | 709/226 |
| 2008/0263621 A1 * | 10/2008 | Austerlitz et al. ............. | 725/139 |
| 2009/0019505 A1 * | 1/2009 | Gopalakrishnan et al. ... | 725/109 |
| 2009/0178096 A1 * | 7/2009 | Menn et al. .................... | 725/114 |
| 2009/0254932 A1 * | 10/2009 | Wang et al. ..................... | 725/14 |

* cited by examiner

*Primary Examiner* — Liangche A Wang
(74) *Attorney, Agent, or Firm* — Thomas, Kayden, Horstemeyer & Risley, LLP

(57) ABSTRACT

Metrics may be gathered at various points of a media distribution system as digital media files are being transmitted to client devices. The metrics may be analyzed to determine whether the media distribution system is performing at an appropriate level. If it is determined that the media distribution system is not performing at an appropriate level, configuration changes may be made to the media distribution system to improve performance. Examples of configuration changes may include changing the number of servers or server instances that are being utilized, changing the quality of the files that are being transmitted, changing the amount of CPU resources being used, adjusting client priorities, and so forth.

22 Claims, 8 Drawing Sheets

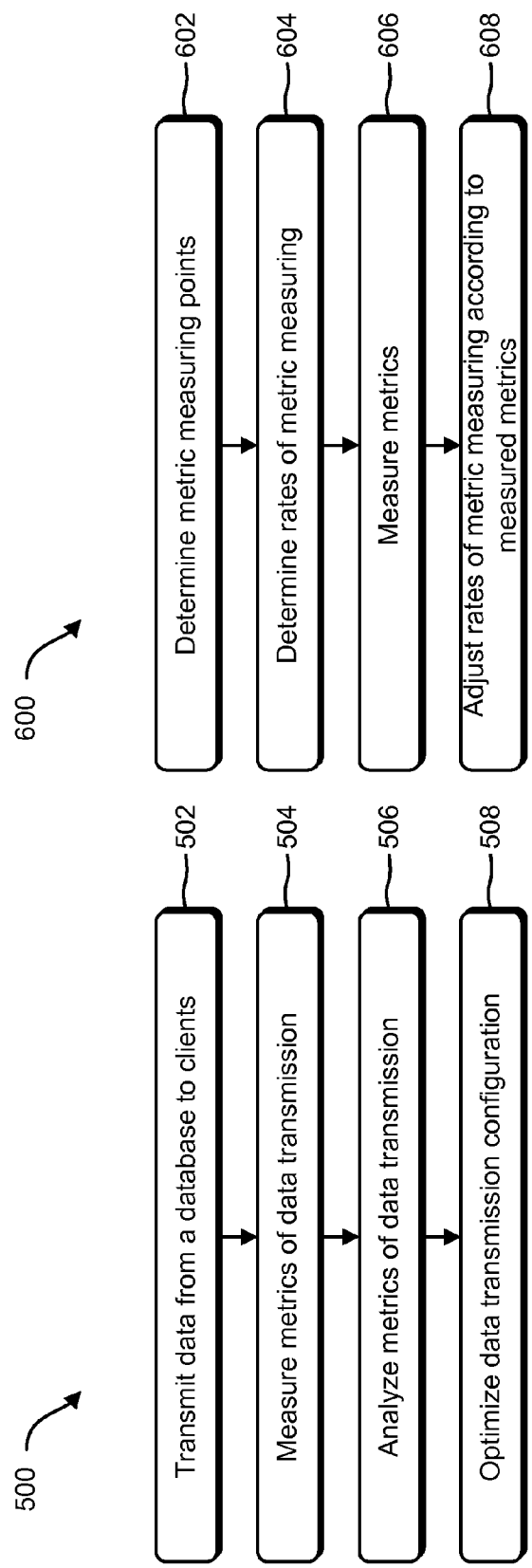

OPTIMIZING MEDIA DISTRIBUTION USING METRICS

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded instantaneously at any time via the Internet. In addition, the electronic device may be backed up, so that physical damage to the device does not necessarily correspond to a loss of the information stored on the device.

As large amounts of information are distributed to client devices, it becomes increasingly difficult to manage the distribution of this large amount of information. Therefore, benefits may be realized by improving the distribution channels and optimizing their behavior.

BRIEF DESCRIPTION OF THE DRAWINGS

FIG. 5 illustrates a flow diagram of a method for optimizing the data transmission configuration of a media distribution system;

FIG. 6 illustrates a flow diagram of a method for measuring the metrics of a data transmission in a media distribution system;

DETAILED DESCRIPTION

The present disclosure relates generally to the distribution of media that is in digital format. This may include movies, music, television programs, electronic books, video games, software, and so forth. Digital media files may be transmitted to client devices over computer networks, such as the Internet. The collection of computing devices and networking devices that facilitate digital delivery of media files to client devices may be referred to as a media distribution system. The present disclosure relates to techniques for dynamically optimizing the performance of a media distribution system.

In accordance with the present disclosure, measurements may be gathered at various points of a media distribution system as digital media files are being transmitted (e.g., streamed) to client devices. These measurements may be referred to as metrics. Examples of metrics include central processing unit (CPU) resources being used, memory being used, the number of clients that are currently being served by the media distribution system, the percentage of clients that are being served within a specified time period, the load that the current media distribution system configuration is placing on the system as a whole, etc.

The metrics may be analyzed to determine whether the media distribution system is performing at an appropriate level. For example, the metrics may be compared to predefined thresholds. If it is determined that the media distribution system is not performing at an appropriate level, configuration changes may be made to the media distribution system to improve performance. For example, if the media distribution system is operating at a degraded level of service, it may be determined that the media distribution system requires additional servers to handle the distribution of media to clients. Other examples of configuration changes may include changing the quality of the files that are being transmitted, changing the amount of CPU resources being used, adjusting client priorities, etc. By making these configuration changes, the overall performance of the media distribution system may be improved.

Figure 1:
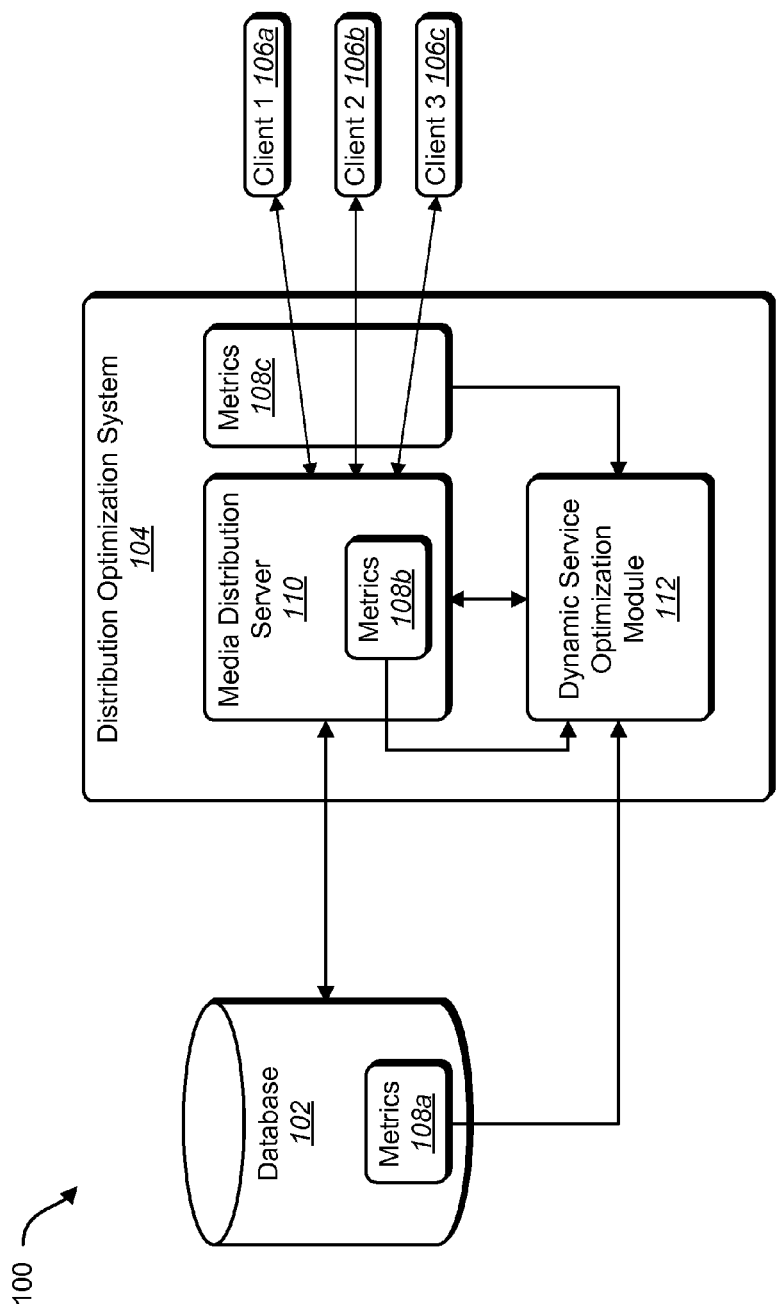
FIG. 1 is a block diagram illustrating a media distribution system with dynamic optimization of distributing data.

FIG. 1 is a block diagram illustrating a media distribution system 100 with dynamic optimization of distributing data. The system 100 may include a database 102. The database 102 may store information to be distributed. For example, the database 102 may store media files that are to be distributed to one or more clients 106. The database 102 may be in electronic communication with a media distribution server 110 that is part of a distribution optimization system 104.

The media distribution server 110 may be responsible for distributing the information in the database 102. For example, the media distribution server 110 may distribute video files from the database 102 to one or more clients 106. The media distribution server 110 may distribute the same file to each client 106, a different file to each client 106, or some combination thereof. The media distribution server 110 may distribute specific files that have been requested by a client 106. Alternatively, the media distribution server 110 may distribute a series of files that are related to the request made by a client 106. For example, a client 106 may request a specific video but the media distribution server 110 may be responsible for choosing the quality of the video file that is delivered to the client 106. The media distribution server 110 may also transmit files to a client 106 that have not been requested by the client 106.

The distribution optimization system 104 may also include a dynamic service optimization module 112. The media distribution server 110 may be in communication with the dynamic service optimization module 112. The dynamic service optimization module 112 may be located on the same server as the media distribution server 110. Alternatively, the dynamic service optimization module 112 may be located on a different server than the media distribution server 110. The dynamic service optimization module 112 may be responsible for optimizing the distribution of files from the database 102 to a client 106. For example, the dynamic service optimization module 112 may make configuration changes to the media distribution server 110 that improve the performance of the media distribution system 100.

The dynamic service optimization module 112 may use metrics 108 to optimize the media distribution system 100.

Metrics 108 may include measurements concerning the distribution of files to clients 106. For example, metrics 108 may include the quality of files that are being delivered, the processing load of the database 102, and the priority of the various distributed files. Metrics 108 are discussed in further detail below in relation to FIG. 3. The dynamic service optimization module 112 may measure metrics 108 at the database 102, the media distribution server 110, or between the media distribution server 110 and the various clients 106.

As discussed above, the media distribution server 110 may transmit information to one or more clients 106. A client 106 may be any electronic device capable of receiving data such as a mobile phone, a computer, etc. Although not shown, the media distribution server 110 may transmit data to hundreds, thousands, or even millions of clients 106. Additionally, the media distribution server 110 may transmit data to diverse types of clients 106. For example, the media distribution server 110 may transmit data to client 1 106*a* which may be a computer while concurrently transmitting data to client 2 106*b* which may be a mobile phone. The clients 106 may communicate with the media distribution server 110 through wired or wireless means. For example, a client 106 may be connected directly to the media distribution server 110, indirectly to the media distribution server 110 through the Internet, indirectly to the media distribution server 110 through a wireless network, etc. A client 106 may also be connected to the media distribution server 110 through other devices such as a router.

The media distribution server 110 may transmit a single file to a client 106. Alternatively, the media distribution server 110 may transmit a series of files to a client 106 over a period of time. For example, the media distribution server 110 may stream parts of a media file to a client 106.

Figure 2:
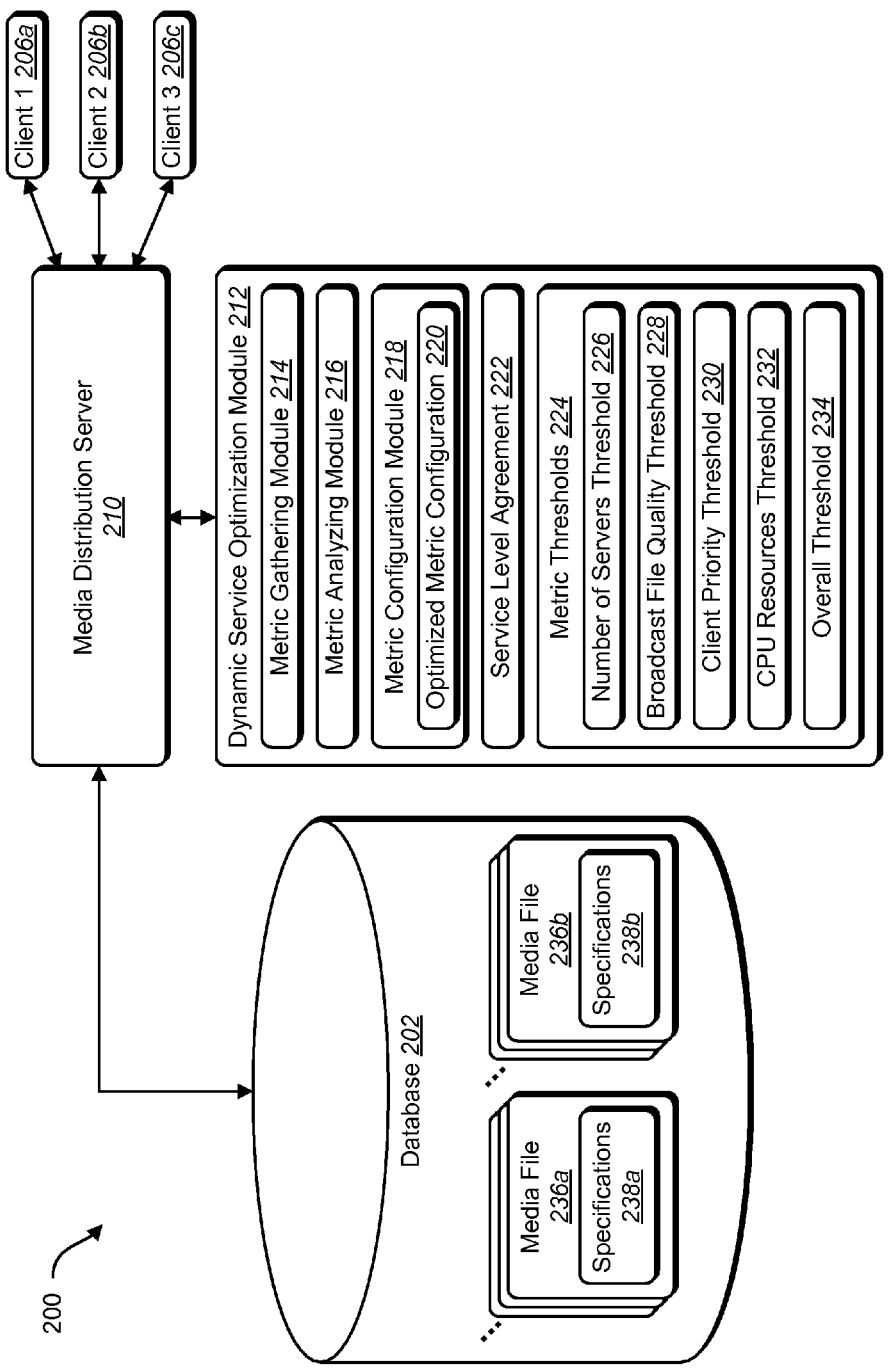
FIG. 2 illustrates a more detailed block diagram of a media distribution system with dynamic optimization of distributing data.

FIG. 2 illustrates a more detailed block diagram of a media distribution system 200 with dynamic optimization of distributing data. The media distribution system 200 may include a database 202. The database 202 may include one or more media files 236. A media file 236 may be information that can be transmitted to a client 206. For example, a media file 236 may be a video file, an audio file, a digital book, a picture, etc. Alternatively, a media file 236 may also be information such as database entries, spreadsheets, word processing documents, or the like. A media file 236 is not limited to the specific types of files listed above and is instead meant to include all types of information that may be stored in a database 202 and/or transmitted to a client 206.

The database 202 may include different versions of the same media file 236. For example, the database 202 may include several versions of a video file with different specifications 238 such as bit rate, video quality, audio quality, or the like.

The media distribution system 200 may include a dynamic service optimization module 212 that instructs a media distribution server 210 to make configuration changes that optimize the media distribution system 200. The dynamic service optimization module 212 may include a metric gathering module 214. The metric gathering module 214 may make measurements at various points of the media distribution system 200. The measurements may be referred to as metrics 108. Metrics 108 are discussed in further detail below in relation to FIG. 3. The metric gathering module 214 may store measured metrics 108 to be used in current and future analysis of the media distribution system 200.

The dynamic service optimization module 212 may also include a metric analyzing module 216. The metric analyzing module 216 may review the measured metrics 108. The metric analyzing module 216 may compare the metrics 108 to one or more metric thresholds 224 to determine whether configuration changes to the media distribution system 200 are necessary.

For example, the metric analyzing module 216 may compare measured metrics 108 to a number-of-servers threshold 226. The media distribution server 210 may operate on one or more servers within the media distribution system 200. The number-of-servers threshold 226 may be a predefined threshold that a network administrator has set as the ideal number of servers for the media distribution system 200. Alternatively, the number-of-servers threshold 226 may be a dynamically changing threshold that is constantly changed by a metric configuration module 218. The number-of-servers threshold 226 may also include a range of metric measurements that are acceptable. The dynamic service optimization module 212 may include other metric thresholds 224 such as a broadcast file quality threshold 228, a client priority threshold 230, and a CPU resources threshold 232. Each of the metric thresholds 224 may be a specific number or a range of acceptable measured metrics 108.

The metric analyzing module 216 may compare each of the metrics to a corresponding metric threshold 224. For example, the metric analyzing module 216 may compare the measured metrics 108 related to the broadcast file quality with the broadcast file quality threshold 228. Alternatively, the metric analyzing module 216 may compare the measured metrics 108 with an overall threshold 234. The metric analyzing module 216 may use an algorithm to compare all of the measured metrics 108 with a single overall threshold 234. For example, each of the components of a measured metric 108 may be assigned a particular weight such that the dynamic service optimization module 212 may convert all of the measured metrics 108 into a single number that can be compared with the overall threshold 234. As with the other metric thresholds 224, the overall threshold 234 may be a single value or a band of values.

If the metric analyzing module 216 compares the measured metrics 108 to a metric threshold 224, the metric analyzing module 216 may determine whether the media distribution system 200 is underperforming, over-performing, or performing at an appropriate level. The metric analyzing module 216 may determine configuration changes to the media distribution system 200 that may optimize the media distribution system 200. For example, the media distribution system 200 may be operating at a degraded level of service. The metric analyzing module 216 may determine that the media distribution system 200 requires additional servers or server instances to handle the distribution of media to clients 206. The metric analyzing module 216 may instruct a metric configuration module 218 of the necessary or recommended changes to the media distribution system 200 configuration.

The metric configuration module 218 may create an optimized metric configuration 220. The optimized metric configuration 220 may include configuration changes to the media distribution system 200. The configuration changes may improve or optimize the media distribution system 200. The optimized metric configuration 220 is discussed in more detail below in relation to FIG. 4.

The metric configuration module 218 may apply the configuration changes in the optimized metric configuration 220 to the media distribution system 200. For example, the metric configuration module 218 may increase the number of servers or server instances allocated to the media distribution system 200. The media distribution server 210 may transmit the media files 236 to one or more clients 206 using the new distribution configurations.

The dynamic service optimization module 212 may also include a service level agreement (SLA) 222. The SLA 222 may define the minimum or maximum characteristics of the media distribution system 200. For example, the SLA 222 may define the maximum amount of time during which a percentage of the clients 206 receive a media file 236. For example, an SLA 222 may require that 99% of the clients 206 receive a requested media file 236 through the media distribution system 200 within five (5) seconds of requesting the media file 236. The metric analyzing module 216 may compare the measured metrics 108 of the media distribution system 200 with the SLA 222 to determine the optimized metric configuration 220.

Figure 3:
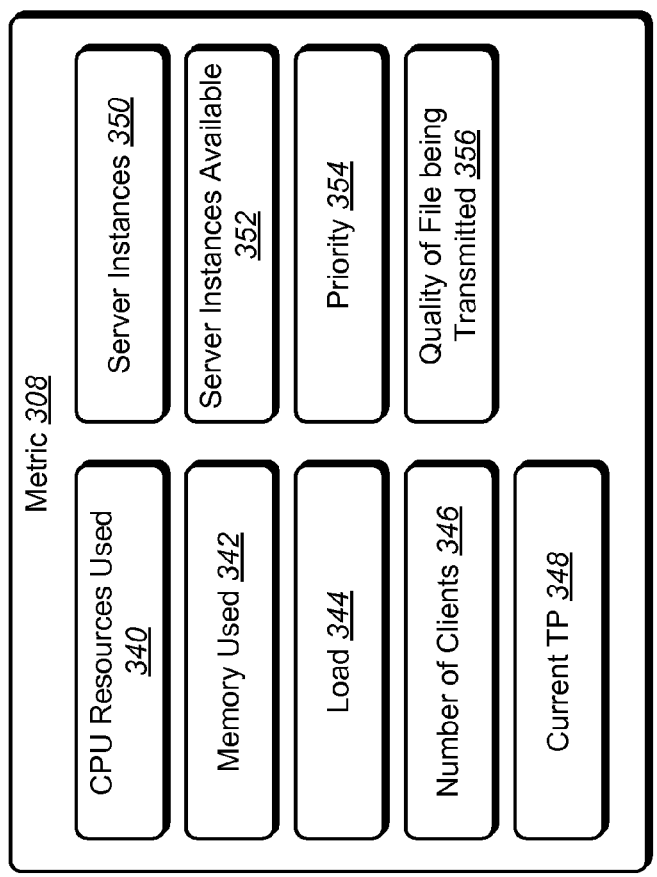
FIG. 3 is a block diagram illustrating media distribution system measurements that may be measured in a metric.

FIG. 3 is a block diagram illustrating media distribution system measurements that may be measured in a metric 308. A metric 308 may include one or more of the listed measurements. A metric 308 may also include additional measurements other than those listed in FIG. 3. A metric 308 may include the central processing unit (CPU) resources 340 that are being used by the media distribution system 200. A metric 308 may also include the memory 342 being used. A metric 308 may include the load 344 that the current media distribution system configuration is placing on the system 200 as a whole, on the database 202, on the media distribution server 210, etc. A metric 308 may also include the number of clients 346 that are currently being served by the media distribution system 200.

A metric 308 may include the current time of performance (TP) 348. The current TP 348 reflects the overall efficiency of the media distribution system 200. The current TP 348 is the percentage of clients 206 that are being served within a specified time period. For example, a TP50 at 2 seconds may mean that 50% of the clients 206 are being served within 2 seconds. A TP90 at 5 seconds may mean that 90% of the clients 206 are being served within 5 seconds. A TP99 at 6 seconds may mean that 99% of the clients 206 are being served within 6 seconds. A client 206 being served may mean that the client 206 receives a requested file, streaming at a requested rate, or a response from the media distribution server 210.

A metric 308 may also include the server instances 350 of the media distribution system 200. A server instance 350 is a predictable amount of dedicated computing capacity. Thus, a server instance 350 may be measured in actual capacity or in the number of servers dedicated to the media distribution system 200. The measured metric 308 may thus include the measured amount of dedicated computing capacity assigned to the media distribution system 200. A metric 308 may also include the number of server instances 352 that are available to the media distribution system 200. For example, the media distribution system 200 may currently operate with only one server instance 350 but may have ten server instances available 352 if the additional server instances are requested.

A metric 308 may also include various priorities 354 of the media distribution system 200. A measured metric priority 354 may include the relative priorities of each of the clients 206 being served. For example, the metric 308 may include information that places a higher priority 354 on all data transmissions to client 1 206a than on all data transmissions to client 2 206b. Likewise, the metric 308 may include information indicating that data transmissions to client 3 206c have the lowest priority 354 of all clients.

A measured metric priority 354 may also include the relative priority 354 of the media distribution system 200 compared to other media distribution systems. For example, the priority 354 of a media distribution system 200 for delivering streaming videos may differ from the priority 354 of a media distribution system 200 for delivering other types of media files, such as audio, still images, etc.

A measured metric priority 354 may also include the relative priority 354 of different media files 236 that are being transmitted. For example, the priority 354 of a video file for a popular television sitcom may have a different priority 354 than a video file for a less popular documentary.

A metric 308 may also include the quality 356 of a file that is being transmitted. For example, transmitted files may have different video and audio qualities that affect the data transmission parameters.

Figure 4:
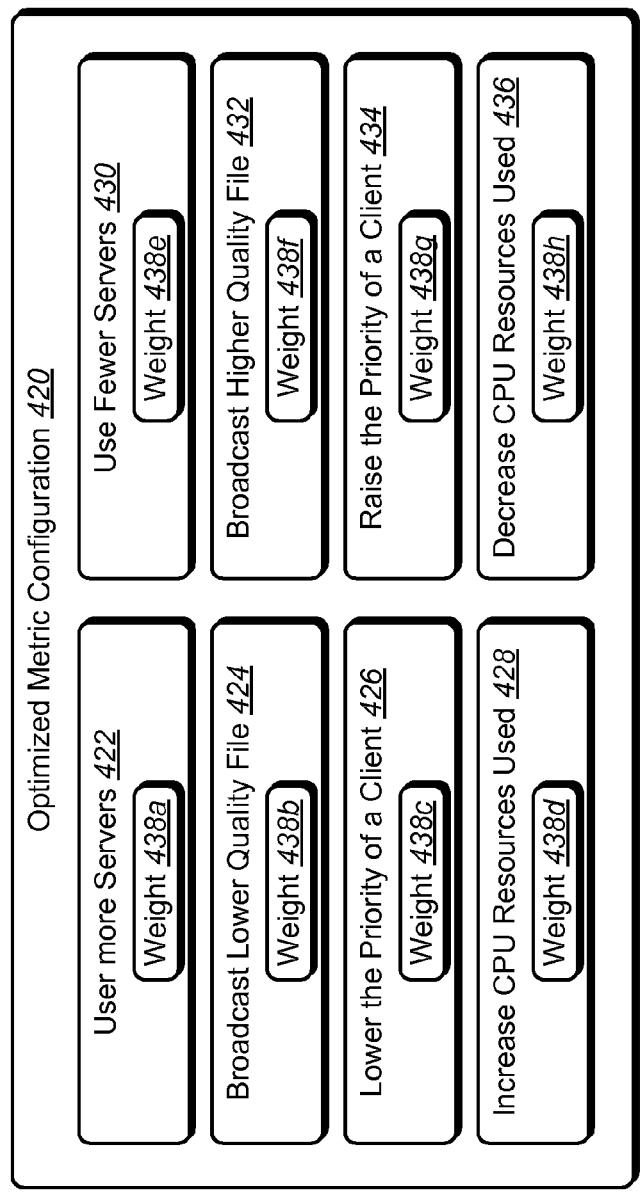
FIG. 4 illustrates one example of an optimized metric configuration.

FIG. 4 illustrates one example of an optimized metric configuration 420. The optimized metric configuration 420 may include instructions that optimize the media distribution system 200. Each of the instructions may include a weight 438 that specifies which instructions are to be implemented first in attempts to optimize the media distribution system 200. The optimized metric configuration 420 may include instructions 422 to use more servers, instructions 430 to use fewer servers, instructions 424 to broadcast a lower quality file, or instructions 432 to broadcast a higher quality file. The optimized metric configuration 420 may also include instructions 426 to lower the priority of a client, instructions 434 to raise the priority of a client, instructions 428 to increase the CPU resources used, and instructions 436 to decrease the CPU resources used.

Other instructions besides those listed above may also be implemented. The optimized metric configuration 420 may include one or more of the above listed instructions. The instructions in the optimized metric configuration 420 may be implemented by the media distribution server 210, the database 202, or the media distribution system 200 as a whole.

FIG. 5 illustrates a flow diagram of a method 500 for optimizing the data transmission configuration of a media distribution system 200. The media distribution system 200 may transmit 502 data from a database 202 to one or more clients 206. During the data transmission, the media distribution system 200 may measure 504 metrics 308 of the data transmission. The media distribution system 200 may analyze 506 the measured metrics 308 from the data transmission. The media distribution system 200 may optimize 508 the data transmission configuration of the media distribution system 200 according to the measured metrics 308.

FIG. 6 illustrates a flow diagram of a method 600 for measuring the metrics 308 of a data transmission in a media distribution system 200. The media distribution system 200 may determine 602 metric measuring points. The metric measuring points may be the points or locations within the media distribution system 200 where measurements of metrics may occur, such as at the database 102, at the media distribution server 110, between the media distribution server 110 and the various clients 106, etc.

The media distribution system 200 may determine 604 the rate of metric measuring that will occur at each metric measuring point. The media distribution system 200 may measure 606 the metrics 308 at each of the metric measuring points. The media distribution system 200 may adjust 608 the rates of metric measuring according to the measured metrics 308.

Figure 7:
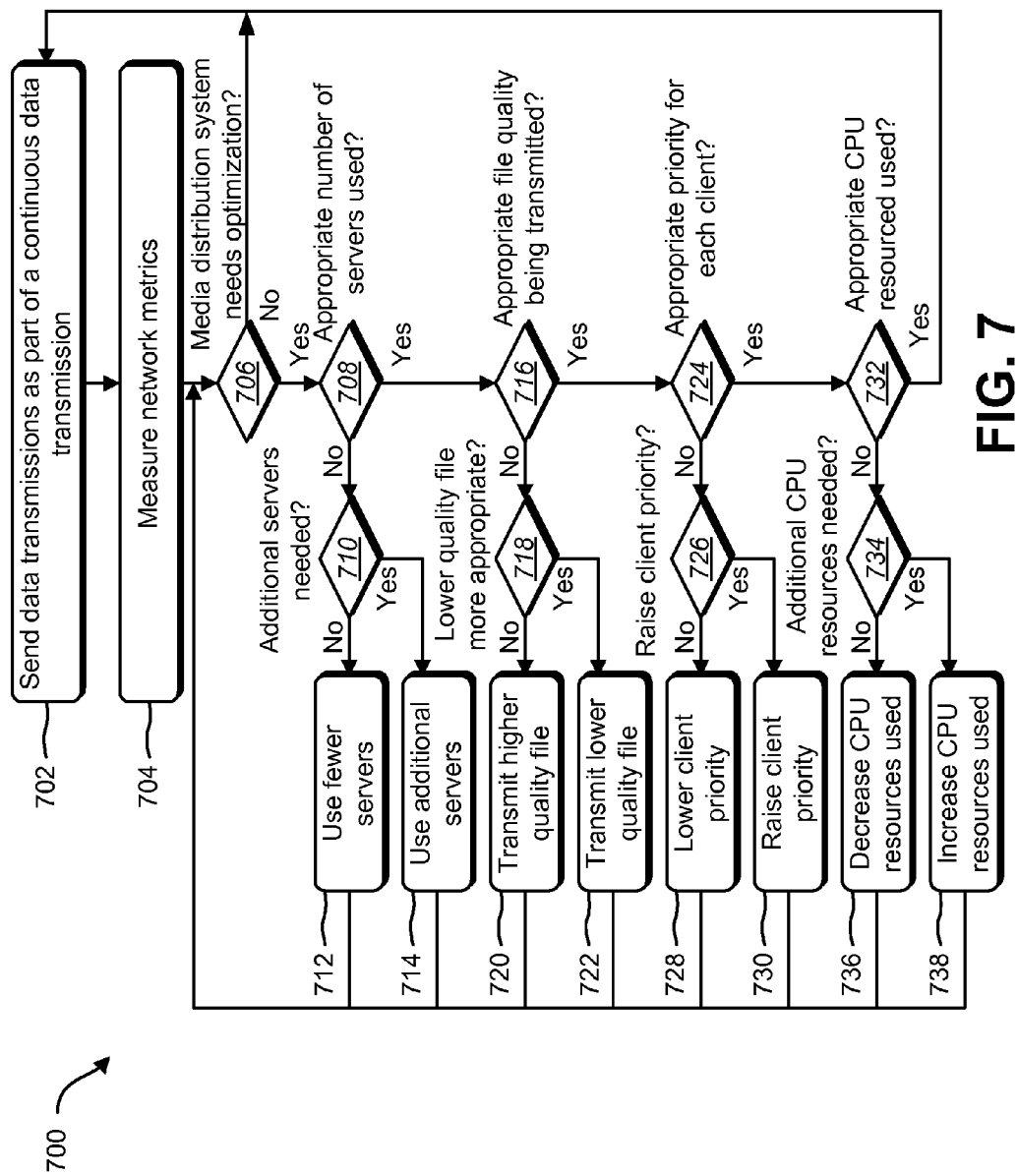
FIG. 7 illustrates a more detailed flow diagram of a method for optimizing the data transmission configuration of a media distribution system.

FIG. 7 illustrates a more detailed flow diagram of a method 700 for optimizing the data transmission configuration of a media distribution system 200. The media distribution system 200 may send 702 one or more data transmissions as part of a continuous data transmission. The media distribution system 200 may measure 704 the network metrics 308. The media distribution system 200 may determine 706 whether the media distribution system 200 needs optimization. If the media distribution system 200 does not need optimization, the media distribution system 200 may continue sending 702 data as part of a continuous data transmission.

If the media distribution system 200 does need optimization, the media distribution system 200 may determine 708 whether the appropriate number of servers or server instances is being used by the media distribution system 200. If the media distribution system 200 is not using an appropriate number of servers or server instances, the media distribution system 200 may determine 710 whether additional servers are needed. If additional servers are not needed, the media distribution system 200 may implement a change to using 712 fewer servers. If additional servers are needed, the media distribution system 200 may implement a change to using 714 additional servers.

The media distribution system 200 may also determine 716 whether the quality of the file(s) being transmitted is appropriate. If the quality of the file(s) being transmitted is not appropriate, the media distribution system 200 may determine 718 whether a lower quality file is more appropriate. If a lower quality file is not more appropriate, the media distribution system 200 may switch to transmitting 720 a higher quality file. If a lower quality file is more appropriate, the media distribution system 200 may switch to transmitting 722 a lower quality file.

The media distribution system 200 may also determine 724 whether the priority assigned to each client 206 is appropriate. If the priority of a client is not appropriate, the media distribution system 200 may determine 726 whether to raise the client 206 priority. If the priority of a client 206 does not need to be raised, the media distribution system 200 may lower 728 the priority of the client 206. If the priority of a client 206 does need to be raised, the media distribution system 200 may raise 730 the priority of the client 206.

The media distribution system 200 may also determine 732 whether the appropriate amount of CPU resources is being used. If the appropriate amount of CPU resources is not being used, the media distribution system 200 may determine 734 whether additional CPU resources are needed. If additional CPU resources are not needed, the media distribution system 200 may decrease 736 the amount of CPU resources used. If additional CPU resources are needed, the media distribution system 200 may increase 738 the amount of CPU resources used.

Figure 8:
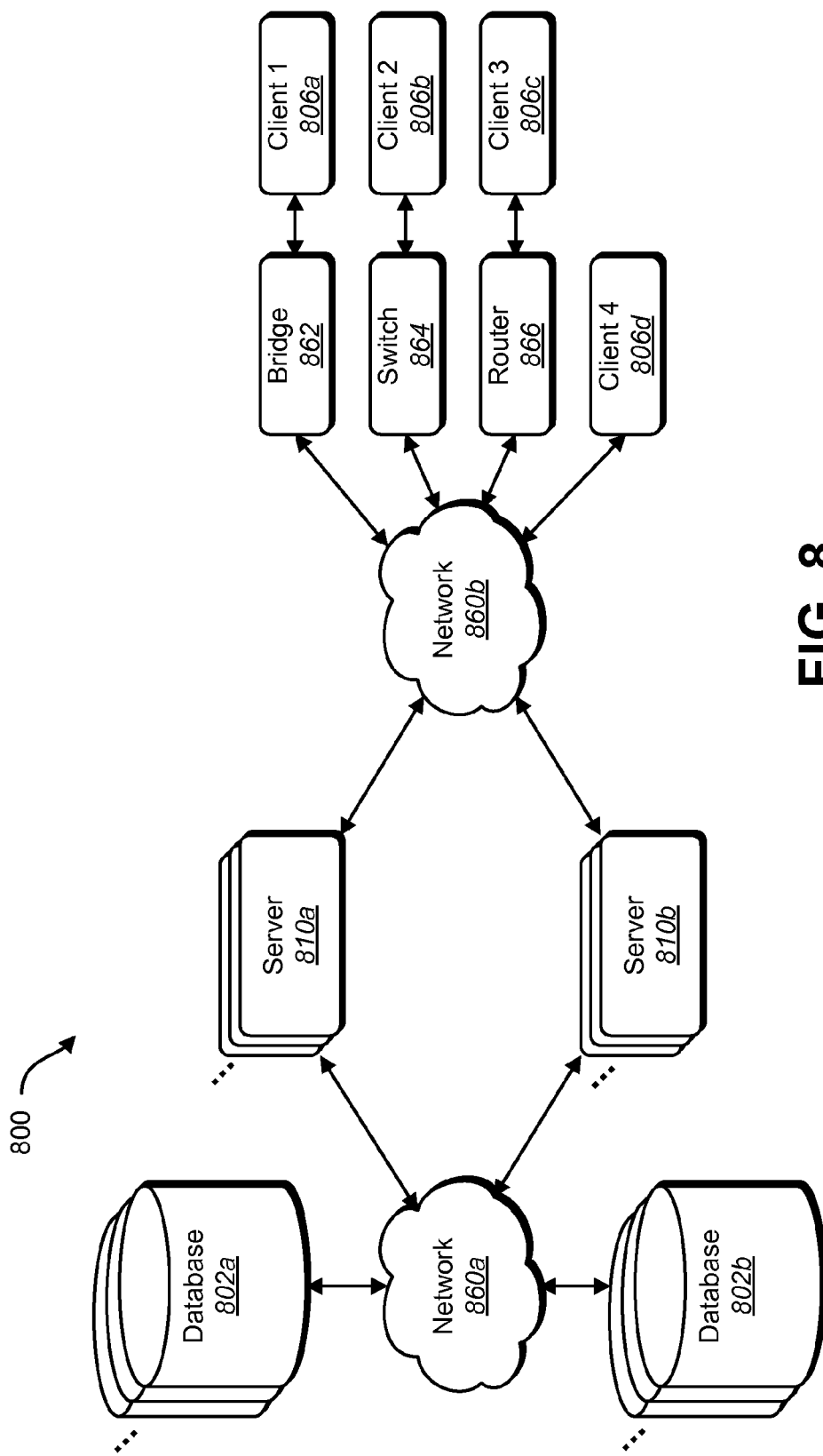
FIG. 8 is a block diagram illustrating an alternative media distribution system.

FIG. 8 is a block diagram illustrating an alternative media distribution system 800. Multiple databases 802 in multiple locations may store media, files, or information to be distributed. The databases 802 may communicate with multiple servers 810 in multiple locations over a network 860 or series of networks 860. The servers 810 may communicate with each other and may be responsible for distributing information from the databases 802 to one or more diverse clients 806. A server 810 may communicate with a client 806 through a network 860. Components within a network 860 may include a bridge 862, switch 864, router 866, or other device that facilitates communication between a server 810 and a client 806.

A metric 308 may be measured anywhere within the media distribution system 800. Thus, a metric 308 may be measured at each database 802, between a database 802 and a server 810, at each server 810, between a server 810 and a client 806, and at the various devices in between that may facilitate network communication such as the bridge 862, switch 864 and router 866 shown. A metric 308 may also include information measured at the client 806. Alternatively, a metric 308 may not include information received from a client 806.

Figure 9:
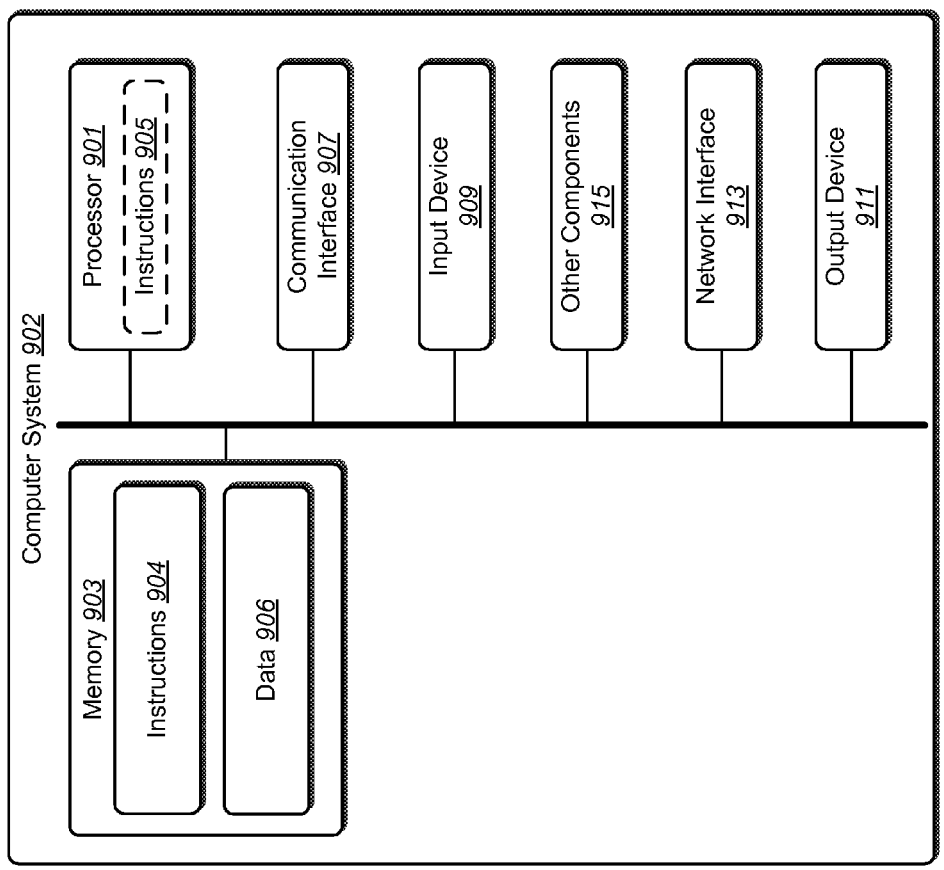
FIG. 9 illustrates various components that may be utilized in a computer system as part of a media distribution system.

FIG. 9 is a block diagram illustrating various components that may be utilized in a computer system 902 to implement a system for optimizing media distribution using metrics. The system for optimizing media distribution using metrics may be implemented in one or more computing devices. Thus, although only one computer system 902 is shown, the configurations herein may be implemented in a distributed system using many computer systems. Computer systems 902 include the broad range of digital computers including microcontrollers, hand-held computers, personal computers, servers, mainframes, supercomputers, minicomputers, workstations, and any variation or related device thereof.

The computer system 902 is shown with a processor 901 and memory 903. The processor 901 may control the operation of the computer system 902 and may be embodied as a microprocessor, a microcontroller, a digital signal processor (DSP) or other device known in the art. The processor 901 typically performs logical and arithmetic operations based on program instructions stored within the memory 903. The instructions 904 in the memory 903 may be executable to implement the methods described herein.

The computer system 902 may also include one or more communication interfaces 907 and/or network interfaces 913 for communicating with other electronic devices. The communication interface(s) 907 and the network interface(s) 913 may be based on wired communication technology, wireless communication technology, or both.

The computer system 902 may also include one or more input devices 909 and one or more output devices 911. The input devices 909 and output devices 911 may facilitate user input. Other components 915 may also be provided as part of the computer system 902.

Data 906 and instructions 904 may be stored in the memory 903. The processor 901 may load and execute instructions 905 from the instructions 904 in memory 903 to implement various functions. Executing the instructions 904 may involve the use of the data 906 that is stored in the memory 903. The instructions 904 are executable to implement one or more of the processes or configurations shown herein, and the data 906 may include one or more of the various pieces of data described herein.

The memory 903 may be any electronic component capable of storing electronic information. The memory 903 may be embodied as random access memory (RAM), read only memory (ROM), magnetic disk storage media, optical storage media, flash memory devices in RAM, on-board memory included with the processor, EPROM memory, EEPROM memory, an ASIC (Application Specific Integrated Circuit), registers, and so forth, including combinations thereof.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the terms "code" and "instructions" should be interpreted broadly to include any type of computer-readable statement(s) or processor-readable statement(s). For example, the terms "code" and "instructions" may refer to one or more applications, programs, routines, sub-routines, functions, procedures, etc.

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium and may be part of a computer-program product. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® Blu-ray disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A server that is configured to optimize performance of a media distribution system, the server comprising:
  a processor;
  memory in electronic communication with the processor;
  instructions stored in the memory, the instructions being executable by the processor to:
    transmit data to at least one client;
    measure metrics of the data transmission, wherein the metrics comprise an indication of an amount of central processing unit (CPU) resources and memory used for the data transmission;
    analyze the metrics to determine whether the media distribution system is performing appropriately; and
    adjust a configuration of the data transmission according to the analyzed metrics, wherein adjusting the configuration of the data transmission comprises at least one of changing how many server instances are used, changing a broadcast quality of a file, changing a priority of a client receiving the data transmission, and changing the amount of the CPU resources used in the data transmission.

2. The server of claim 1, wherein the transmitted data comprises digital media files.

3. The server of claim 1, wherein the configuration of the data transmission is optimized while the data is being transmitted to the at least one client.

4. The server of claim 1, wherein the data is streamed to the at least one client.

5. The server of claim 1, wherein the data is transmitted to the at least one client via an Internet.

6. The server of claim 1, wherein analyzing the metrics comprises comparing the metrics to at least one threshold.

7. A method for optimizing media distribution, the method comprising:
  measuring a plurality of metrics associated with transmission of a plurality of media files to a plurality of clients by a media distribution system, wherein the metrics are indicative of a measure of performance of the media distribution system, the metrics comprising at least one of an indication of central processing unit (CPU) resources used by the media distribution system, an indication of memory used by the memory distribution system, an indication of a load that the transmission of the media files places on the media distribution system, and an indication of a number of clients that are receiving data from the media distribution system;

analyzing the metrics based at least in part on a weighted metrics threshold; and optimizing a configuration of the media distribution system according to the metrics.

8. The method of claim 7, wherein measuring the metrics comprises:
   determining metric measuring points;
   determining a plurality of rates of metric measurement; and
   adjusting the rates of metric measurement according to the measured metrics.

9. The method of claim 7, wherein analyzing the metrics further comprises summing all of the weighted metrics and comparing the sum of the weighted metrics to an overall threshold.

10. A method for optimizing media distribution, the method comprising:
    measuring a plurality of metrics associated with transmission of a plurality of media files to a plurality of clients by a media distribution system, wherein the metrics are indicative of a measure of performance of the media distribution system;
    analyzing the metrics based at least in part on a weighted metrics threshold; and
    optimizing a configuration of the media distribution system according to the metrics, wherein optimizing the configuration of the media distribution system comprises changing at least one of a number of server instances that are used by the media distribution system, a broadcast quality of at least some of the media files that are transmitted, a plurality of priorities of at least one of the clients, and an amount of central processing unit (CPU) resources used by the media distribution system.

11. A method for optimizing media distribution, the method comprising:
    measuring a plurality of metrics associated with transmission of a plurality of media files to a plurality of clients by a media distribution system, wherein the metrics are indicative of a measure of performance of the media distribution system;
    analyzing the metrics; and
    optimizing a configuration of the media distribution system according to the metrics, wherein optimizing the configuration of the media distribution system comprises changing at least one of a broadcast quality of at least some of the media files that are transmitted, a number of server instances that are used by the media distribution system, a plurality of priorities of at least one of the clients, and an amount of central processing unit (CPU) resources used by the media distribution system.

12. A server that is configured to optimize media distribution, the server comprising:
    a processor;
    memory in electronic communication with the processor;
    a plurality of instructions stored in the memory, the instructions being executable by the processor to:
       measure a plurality of metrics associated with transmission of a plurality of media files to a plurality of clients by a media distribution system, wherein the metrics are indicative of a measure of performance of the media distribution system;
       analyze the metrics to determine whether a configuration of the media distribution system should be changed based at least in part on a weighted metrics threshold; and
       optimize the configuration of the media distribution system if the metrics indicate that the media distribution system is not performing appropriately, wherein optimizing the configuration of the media distribution system comprises changing how many server instances are used by the media distribution system.

13. The server of claim 12, wherein the metrics comprise an indication of central processing unit (CPU) resources used by the media distribution system.

14. The server of claim 12, wherein the metrics comprise an indication of memory used by the media distribution system.

15. The server of claim 12, wherein the metrics comprise an indication of a load that the transmission of the media files places on the media distribution system.

16. The server of claim 12, wherein the metrics comprise an indication of how many clients are receiving data from the media distribution system.

17. The server of claim 12, wherein optimizing the configuration of the media distribution system comprises changing a broadcast quality of at least some of the media files that are transmitted.

18. The server of claim 12, wherein optimizing the configuration of the media distribution system comprises changing priorities of at least some of the clients.

19. The server of claim 12, wherein optimizing the configuration of the media distribution system comprises changing an amount of central processing unit (CPU) resources used by the media distribution system.

20. The server of claim 12, wherein measuring the metrics comprises:
    determining metric measuring points;
    determining a plurality of rates of metric measurement; and
    adjusting the rates of metric measurement according to the measured metrics.

21. The server of claim 12, wherein analyzing the metrics further comprises comparing the metrics to at least one threshold.

22. A non-transitory computer-readable medium comprising a plurality of executable instructions for:
    measuring metrics associated with transmission of media files to multiple clients by a media distribution system, wherein the metrics are indicative of performance of the media distribution system;
    analyzing the metrics to determine whether a configuration of the media distribution system should be changed, wherein analyzing the metrics comprises comparing a weighted sum of the metrics to an overall threshold; and
    optimizing the configuration of the media distribution system according to the metrics, wherein optimizing the configuration of the media distribution system comprises changing at least one of a number of server instances that are used by the media distribution system, a broadcast quality of at least some of the media files that are transmitted, a plurality of priorities of at least one of the clients, and an amount of central processing unit (CPU) resources used by the media distribution system.

* * * * *